Jan. 19, 1954 W. J. O'BRIEN 2,666,853

STOP-ON-SIGNAL RADIO APPARATUS

Filed June 5, 1950 3 Sheets-Sheet 1

Inventor
William J. O'Brien
By Hinkle, Horton, Ahlberg & Wupper
Attorneys

Inventor
William J. O'Brien
By Hinkle, Horton, Ahlberg & Kupper
Attorneys

STOP-ON-SIGNAL RADIO APPARATUS

Filed June 5, 1950 3 Sheets-Sheet 3

Inventor
William J. O'Brien
By Hinkle, Horton, Ahlberg & Kupper
Attorneys

Patented Jan. 19, 1954 2,666,853

UNITED STATES PATENT OFFICE 2,666,853

STOP-ON-SIGNAL RADIO APPARATUS

William J. O'Brien, Oxshott, England, assignor, by mesne assignments, to General Motors Corporation, Detroit, Mich., a corporation of Delaware Application June 5, 1950, Serial No. 166,233

23 Claims. (Cl. 250—40)

Figure 1:
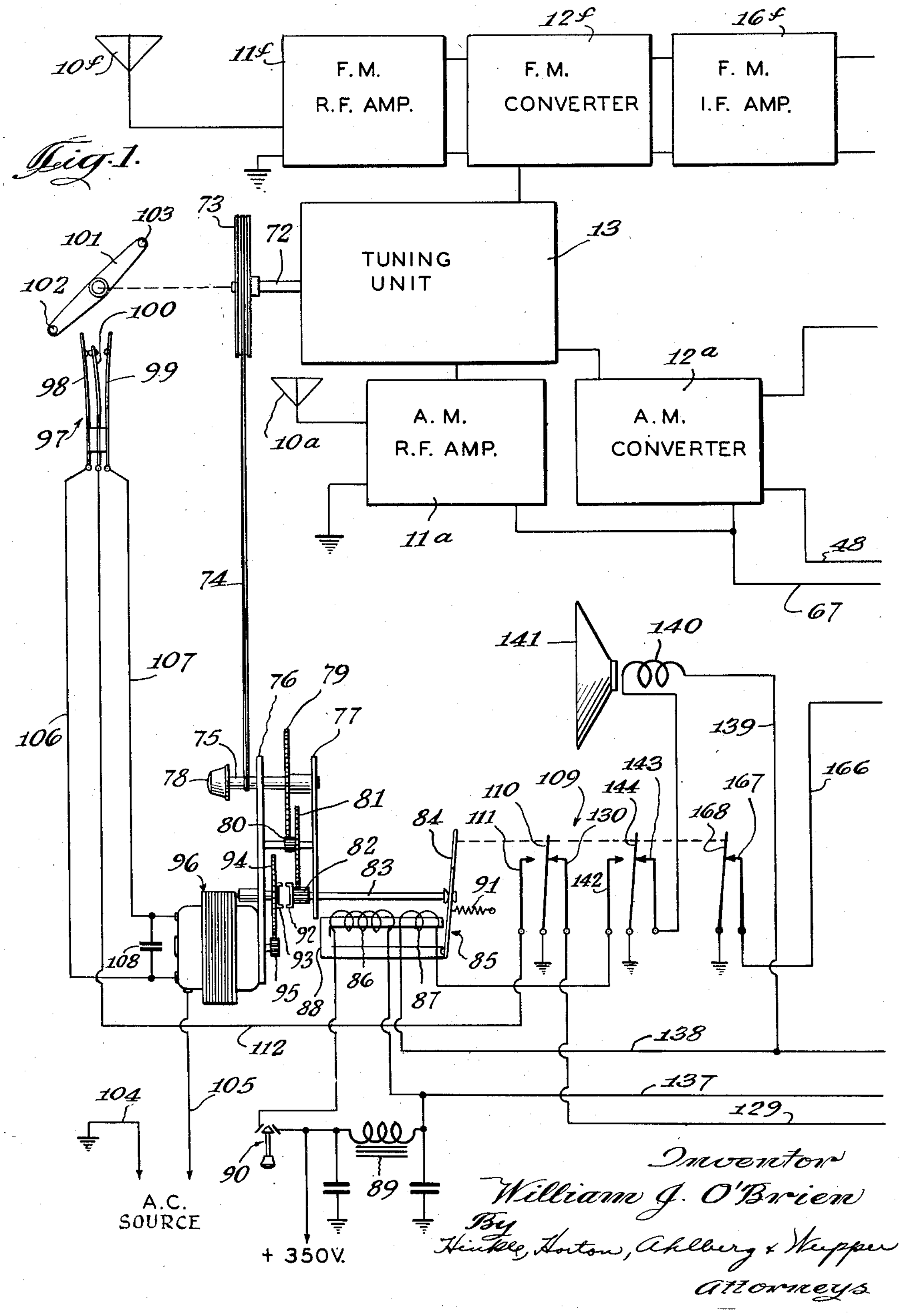

This invention relates to stop-on-signal radio apparatus for operation by amplitude modulated signals, frequency or phase modulated signals, or both. More particularly, it relates to stop-on-signal apparatus, especially receivers requiring no manual presetting to tune in signals of predetermined strength when the signals are either amplitude or frequency modulated. Stop-on-signal receivers have been also known in the art as stop-on-carrier, signal-seeking, or signal-tuned receivers. Receivers of this general type have been described and claimed in previous patents, such as William J. O'Brien Patent No. 2,426,580, issued August 26, 1947; also William J. O'Brien, Patent No. 2,526,266, issued October 17, 1950, and Patent No. 2,569,426, issued August 25, 1951; and E. F. Andrews Patent No. 2,262,218, issued November 11, 1941, Patent No. 2,326,738, issued August 17, 1943, Patent No. 2,493,742, issued January 10, 1950.

Although the invention to be described is especially adapted for use with stop-on-signal receivers for broadcast reception, its use is not necessarily restricted to this field, as stop-on-signal apparatus may also be applied to radio transmitters, electronic controls, and other frequency selective apparatus.

In the past, stop-on-signal tuning apparatus has been generally directed toward the automatic tuning of amplitude modulated signals from broadcasting stations. The advent of frequency modulated broadcasting stations in greater numbers calls for extending the advantages of stop-on-signal tuning to the reception of frequency modulated signals either separate from or alternatively with amplitude modulated signals.

It is also advantageous to provide frequency modulated stop-on-signal means which operate in conjunction with amplitude modulated stop-on-signal means in such a way that frequency modulated signals or amplitude modulated signals can be tuned in alternatively with the least complication and cost consistent with satisfactory operation.

Certain components ordinarily used with frequency modulated signals may also be used with amplitude modulated signals to facilitate a combined amplitude and frequency modulation device, and to take advantage of certain features of frequency modulated apparatus when receiving amplitude modulated signals.

An FM receiver employing a twin rectifier discriminator for detection is correctly tuned at the point of zero average voltage on the discriminator frequency voltage curve. With this arrangement, as the signal is approached the voltage rises to a maximum, falls to zero, and rises again to a maximum with opposite polarity. The correct zero point at the center of the characteristic S-shaped frequency voltage curve is established when the rate of tuning is slow compared to the rate of signal frequency modulation so that the individual modulation swings are averaged out by delay in circuit response. The problem of operating stop-on-signal tuning so that stoppage is effected at zero or near zero average voltage is more difficult than stopping it on or near a voltage frequency peak. If the first voltage peak of the S curve supplies the stopping signal, then the tuner must overrun the correct amount to the center of the curve. This requires that means be provided to compensate for varying signal intensity, and particularly for differences in tuner speed at the moment of stopping, as the overrun is a function of the tuning speed.

On the other hand, something more than a stopping signal in response to zero voltage is needed, because a stopping signal must not be produced by mere absence of a signal. To solve this problem, I may employ a device which tends to stop in response to a high voltage portion of the discriminator S curve, or in response to a high voltage portion of the voltage frequency curve of an associated circuit. However, this tendency is restrained or delayed until the discriminator voltage arrives at or closely approaches zero. Thus the stopping signal depends on the close approach of one voltage to zero while another voltage exceeds a predetermined value. I have found that if the rate of tuning is not too fast, and if the near zero voltage condition must persist for appreciable time before it permits the stopping signal to occur, satisfactory tuning of frequency modulated signals may be secured. Objectionable overrun of the tuning means may be prevented by causing the stopping signal to disconnect from the tuner all tuner operating parts having considerable momentum compared to the stopping friction. It has been found that by this or other similar methods objectionable overrun can be prevented, especially when the speed of the tuner is moderate.

In view of the foregoing, it will be understood that among the objects of my invention are the following:

To provide improved stop-on-signal radio apparatus and parts thereof;

To provide stop-on-signal radio apparatus adapted satisfactorily to tune in frequency modulated signals;

To provide radio apparatus capable of tuning in either AM or FM signals in the stop-on-signal manner;

To provide such an FM-AM or AM-FM stop-on-signal receiver utilizing a twin rectifier discriminator for FM-AM or AM-FM stop-on-signal tuning;

To provide FM and/or AM stop-on-signal apparatus having means responsive to a predetermined voltage tending to cause stoppage and means for preventing the stopping signal until a restraining voltage falls substantially toward zero in response to the tuning in of either an FM or an AM signal.

It is a further object to provide means for producing a stoppage in response to the presence of a predetermined voltage and means for preventing stoppage until a voltage falls substantially toward zero.

It is a further object to provide a manual and automatic tuning system in which the operation of automatic starting means starts automatic tuning, and in which manual tuning may be performed without any other operation besides the tuning motion at all times except when the power tuning is in operation.

It is a further object to provide means discriminating against the production of a stopping signal in response to static or interference while tuning FM signals and/or while tuning AM signals.

A further object is to provide an AM-FM receiver in which the operation of a manual control will adapt the receiver to stop-on-signal FM tuning in one position or stop-on-signal AM tuning in another position.

A further object is to utilize an oscillator which changes its state responsive to the correct tuning in of a signal to provide the stopping signal for stop-on-signal tuning.

It is a further object to provide an oscillator which oscillates in response to an approach to zero voltage on its control element to tune in a signal which is correctly tuned when a voltage reaches or closely approaches zero.

It is a further object to provide a plurality of control means, and oscillator means, in which a first voltage tending to cause oscillation is connected to one control means, a second voltage which becomes zero at correct tuning is connected to another control means so as to prevent oscillation except in the vicinity of zero voltage, the oscillator means being coupled to the tuner stopping means so that the tuner is stopped when the first voltage is above a predetermined value and the second voltage falls toward zero.

Figure 1A:
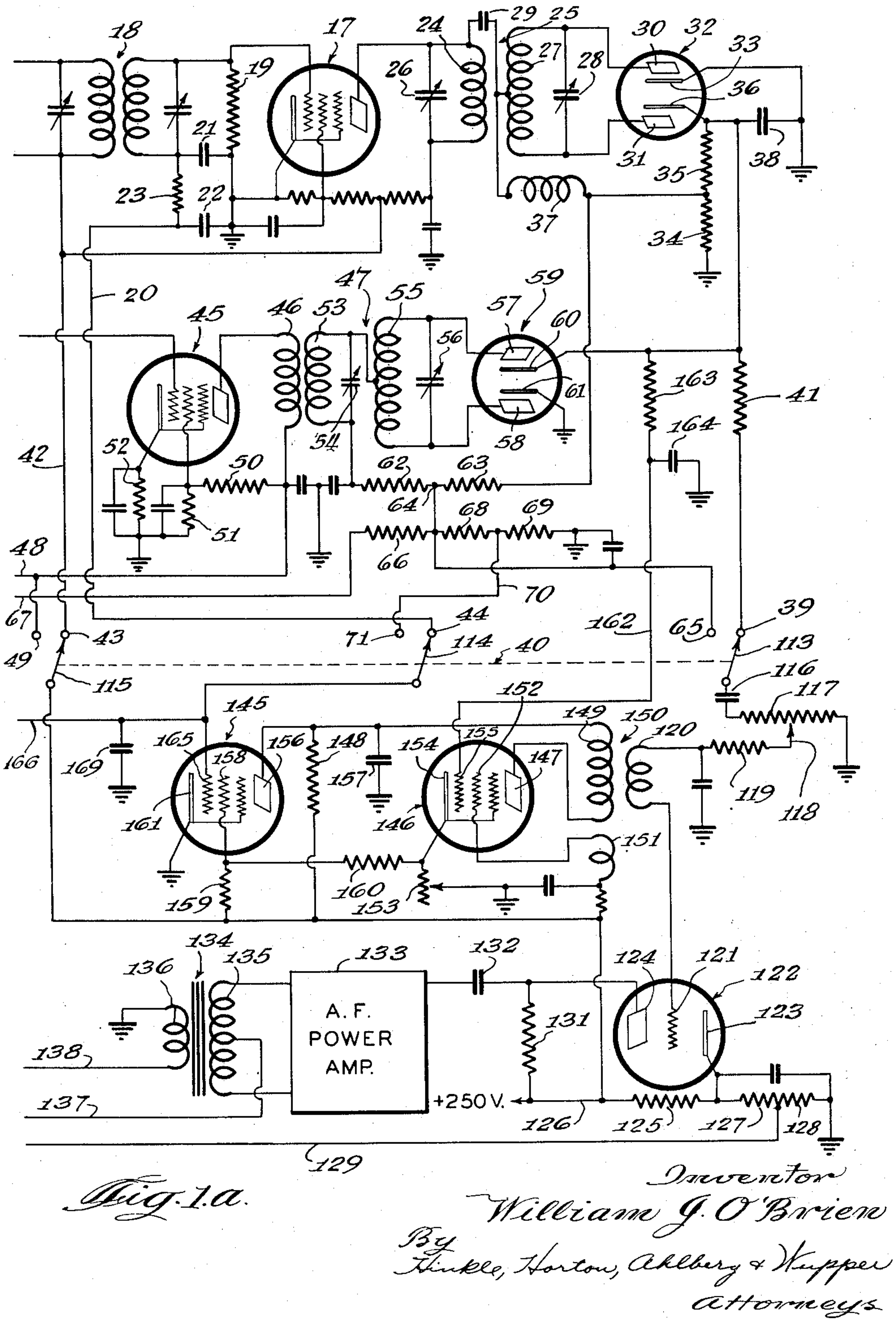
Figure 2:
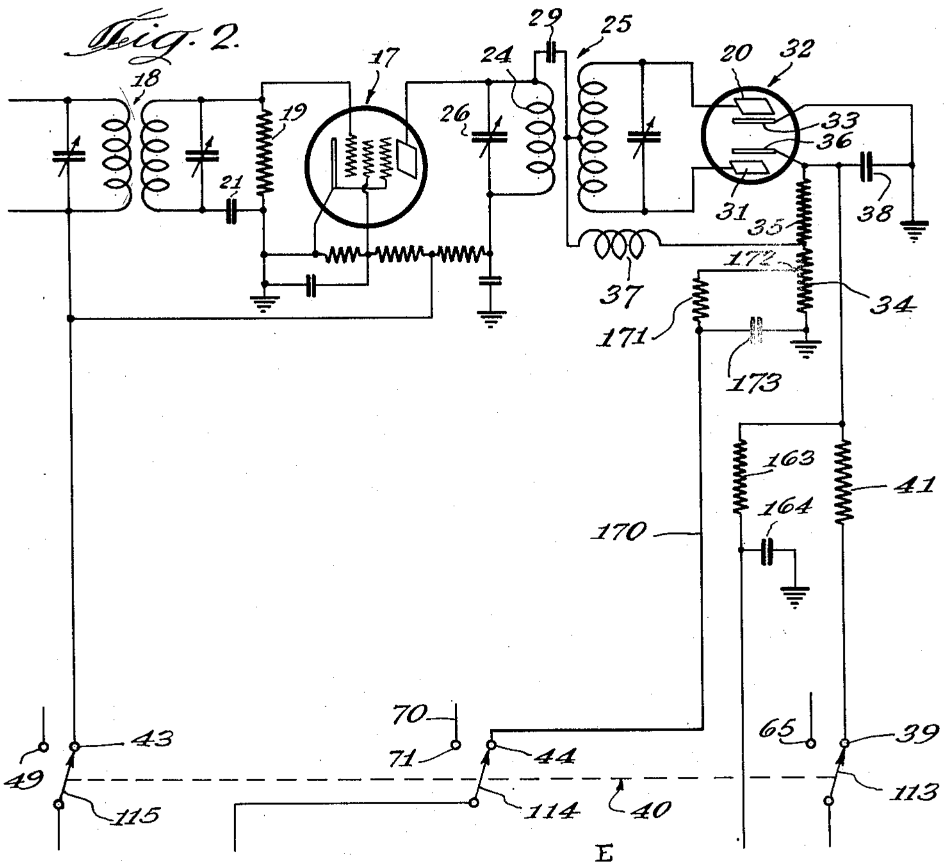
Figure 3:
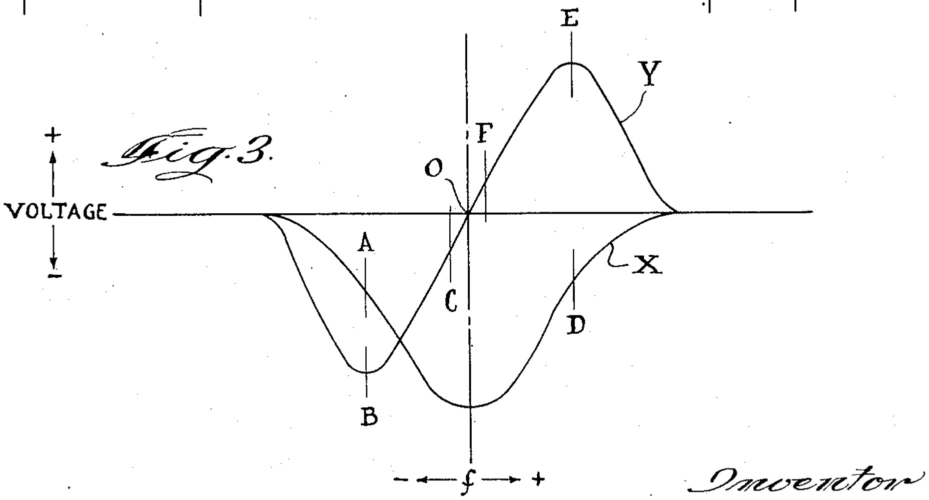

Further objects, advantages, and capabilities of my invention will become apparent upon study of the following description and accompanying drawings, in which:

Fig. 1 and Fig. 1*a* together constitute a schematic illustration of a complete receiver embodying my invention;

Fig. 2 is a partial wiring diagram showing a modification of part of the circuit shown in Fig. 1 and Fig. 1*a*; and Fig. 3 is a graphical illustration of tuning curves, illustrating voltages obtained in certain circuits of the receiver in Fig. 1, shown plotted against frequency.

Fig. 1, together with Fig. 1*a*, represents a receiver of the superheterodyne type, suitable for the reception of either amplitude modulated or frequency modulated signals.

For more ready understanding of this invention, the general features will first be briefly described.

This receiver includes a tuner unit which may include a gang of FM tuning reactances operated by a single shaft. The receiver also includes frequency modulating receiving apparatus and amplitude modulation receiving apparatus. The tuner unit may be operated by a motor mechanism controlled by a stopping relay. This relay is in turn controlled by a stop-on-signal control device which may include a control and an oscillator tube. A common audio amplifier and speaker may be employed for both FM and AM reception, and also for amplifying the stopping signal from the control device, and supplying this signal to the stopping relay.

A manually operable switch is provided having an FM position and an AM position. In the FM position, the control device and the audio amplifier are connected to the FM receiving apparatus and the B voltage supply is connected to the FM receiving apparatus and disconnected from the AM receiving apparatus. When this switch is moved into the AM position, B voltage is supplied to the AM receiving apparatus and disconnected from the FM receiving apparatus, and the AM receiving apparatus is connected to the stop-on-signal tuning device and the audio amplifier. Thus the operation of this switch adapts the receiver for the stop-on-signal tuning of FM signals or AM signals, depending upon the position in which this switch is placed.

The function of the stop-on-signal tuning device is, broadly, to cause the stopping relay to operate and stop the tuning unit when it tunes in a signal, but more specifically, its function is to cause the operation of the relay only when a desired signal is accurately tuned in. Correct tuning is indicated when the average voltage output of the discriminator falls from a peak of the S discriminator voltage versus frequency curve to zero voltage (as shown in curve Y of Fig. 3). However, zero voltage does not itself provide an operating signal. Such a signal may be provided by the peak voltage produced by a signal on the limiter grid (as shown in curve X in Fig. 3), or by the voltage rise occurring in one of the discriminator rectifier circuits which persists in each rectifier separately, considerably past the center of the discriminator output voltage frequency curve. During AM operation, the voltage may be the detector AVC voltage. These operating voltage sources do not by themselves provide a sufficiently exact indication of correct tuning. However, the combination of this actuating voltage applied to the control tube of the tuning device and a voltage from the discriminator applied to the oscillator tube, permit the latter to oscillate only when a negative voltage is applied to the control tube and when the voltage on the grid of the oscillator tube is reduced to the vicinity of zero. When the oscillator tube oscillates, its oscillatory voltage output is impressed upon the first audio tube which effects the operation of the stopping relay as this relay is coupled to the output of the audio power amplifier during tuning. Thus the relay is operated when the tuning unit has tuned in either an FM or AM signal so that the discriminator voltage resulting from the signal has fallen substantially to zero. This occurs at the midpoint between the positive and negative discriminator voltage versus frequency peaks (as shown in curve Y, Fig. 3).

The motor mechanism includes a clutch which is operated by the stopping relay. The disengagement of this clutch by the operation of the relay insures abrupt stoppage in response to the oscillation of the oscillator, so that little or no overrun occurs. For FM tuning the response of the circuits and the speed of the tuning unit may be sufficiently slow with respect to the frequency of the modulation being received, so that oscillation of the oscillator occurs mainly in response to the variation of frequency produced by the movement of the tuning unit, and without any major effect as a result of the variation in frequency due to modulation. Stoppage of the tuner by static or other brief intense disturbances is also eliminated or greatly reduced by suitably delaying the start of oscillation.

Referring now in greater detail to Figs. 1 and 1a of the drawings, 10f represents an antenna connected to the FM receiver. The frequency modulation receiving apparatus comprises a tuned FM radio frequency amplifier 11f and converter 12f, tunable by their associated tuning means within a tuning unit 13. The converter 12f is coupled to the FM intermediate frequency amplifier 16f.

The output of this amplifier is applied to the grid of the limiter tube 17 by means of an intermediate frequency transformer 18. Tube 17 may be a pentode, connected in well known manner, to function as an amplitude limiter. A resistor 19 is connected between the grid of tube 17 and ground. The cathode of tube 17 is grounded, and when a radio frequency voltage appears across the secondary of transformer 18, grid rectification produces a negative potential at the grid end of resistor 19. This direct current potential is applied to conductor 20. Capacitors 21 and 22 and resistor 23 provide radio frequency filtering.

The plate of tube 17 is connected to one end of primary winding 24 of discriminator transformer 25. The primary winding 24 may be tuned to resonate at center intermediate frequency by capacitor 26. The discriminator transformer 25 is of the well known type having a center tapped secondary winding 27 inductively coupled to the primary winding 24, and tuned to resonance by means of capacitor 28. A capacitor 29 connects the plate end of primary winding 24 to the center tap of secondary winding 27. One end of secondary winding 27 connects to plate 30 and the other end to plate 31 of a twin diode rectifier tube 32. The cathode 33, associated with plate 30, is connected directly to ground. Two resistors 34 and 35, of equal value, are connected in series between cathode 36 of tube 32 and ground. The center tap of secondary winding 27 is connected through radio frequency choke coil 37 to a point between resistors 34 and 35. The cathode 36 of tube 32 is bypassed to ground by a capacitor 38 and is connected to a contact 39 of the FM-AM changeover switch 40 through a series resistor 41. Plate voltage is supplied to FM units 11f, 12f, and 16f, as well as to the limiter tube 17, through conductor 42, which is connected to contact 43 of switch 40. Switch contact 44 of this switch is connected to conductor 20 which carries the negative potential developed in the grid circuit of limiter 17 when a signal is tuned in.

The amplitude modulation receiver apparatus which is not used for frequency modulation, consists of an antenna 10a, the R. F. amplifier 11a, and the converter 12a, with their associated AM variable tuning means in the tuning unit 13. The output of the converter 12a is applied to the grid of an intermediate frequency amplifier, which may be an electron tube 45 of the pentode type. The amplifier tube 45 is supplied with plate voltage through the plate winding 46 of the AM discriminator transformer 47, from conductor 48, which is connected to contact 49 of the changeover switch 40, and which also supplies voltage to the units 14 and 15 of the AM receiver section. Screen voltage for the tube 45 is obtained from a voltage divider consisting of two resistors 50 and 51, connected from conductor 48 to ground. Cathode bias for tube 45 is provided by resistor 52.

The plate winding 46 is closely coupled to the primary winding 53 of the discriminator transformer 47. Primary winding 53 is tuned to resonate at the intermediate frequency by means of a capacitor 54. The secondary winding 55 is inductively coupled to the primary winding 53 and consists of a center tapped winding tuned to the intermediate frequency by a capacitor 56. One end of secondary winding 55 is connected to a plate 57 and the other end to a plate 58 of a twin diode rectifier tube 59. The cathode 60 of tube 59 is connected to the cathode 36 of the twin diode rectifier tube 32. The cathode 61 of tube 59 is grounded. One end of primary winding 53 is connected to the center tap of the secondary winding 55. The other end of primary winding 53 is connected through resistors 62 and 63 to the junction between resistors 34 and 35. Due to the extra winding 46 closely coupled to the winding 53, the winding 53 is isolated from the voltage applied to the plate of the tube 45, and therefore no isolating condenser is required in the lead from the primary to the center tap of the secondary winding 55.

The junction point 64 between resistors 62 and 63 is connected to switch contact 65 of the change-over switch 40. An AVC resistor 66 is connected to junction point 64. Conductor 67, connected to the other end of resistor 66, is the AVC line which supplies automatic volume control voltage to the AM R. F. amplifier 11a, the converter 12a, and the intermediate frequency amplifier tube 45. Resistors 68 and 69, in series, are connected from point 64 to ground and the junction between these resistors is connected through conductor 70 to a switch contact 71 of change-over switch 40.

The tuning means for both FM and AM reception may be operated by a rotatable shaft 72. A gang of variable condensers for FM tuning and another gang of variable condensers for AM tuning may have their rotors mounted on the shaft 72. If desired, variable inductances may be employed for tuning FM and/or AM. The tuner shaft 72 carries a large diameter pulley 73. The shaft 72 is driven by a cord 74 fastened to the pulley 73 and operating on its periphery. For adequate frictional engagement, one or more turns of the cord 74 is wrapped around the small diameter shaft 75. The shaft 75 is rotatably mounted in bearing plates 76 and 77, and is provided with a knob 78 for manual operation. A gear wheel 79 is secured to the shaft 75 and meshes with a pinion 80 which is mounted on a shaft freely rotatable in bearing plates 76 and 77. Pinion 80 is secured to a gear wheel 81 which meshes with a pinion 82, which is mounted on a shaft 83 for free rotation in bearing plate 77.

The end of shaft 83 is operably engaged for free rotation by the armature 84 on the stop-on-signal relay 85.

Relay 85 is provided with two windings 86 and 87 around one leg of a ferromagnetic U member 88. The voltage drop across filter choke 89 is used to energize winding 86 when the tuning switch button 90 is operated. When this occurs, the armature 84 is moved against the tension of the armature spring 91 and closes the magnetic circuit across the open side of the U member 88. After switch button 90 is released, the armature 84 is held in closed position by the residual flux in the magnetic circuit of the relay until the bucking relay winding 87 is energized to produce a flux of a polarity opposite to that of the residual flux, thus permitting spring 91 to move armature 84 to open position. The means by which winding 87 is energized will be described more fully later.

A clutch member 92 is rigidly secured to the pinion 82 and is adapted to engage a clutch member 93, when the relay winding 86 is energized. This causes the armature 84 to move to closed position, thus moving shaft 83, pinion 82, and clutch member 92 to the left, as viewed in Fig. 1. Clutch member 93 is rigidly secured to a gear wheel 94 which is mounted on a shaft freely rotatable in bearing plate 76. Gear wheel 94 meshes with a pinion 95 secured to the rotor shaft of a motor 96.

The motor 96 may be any type of reversible motor. However, I prefer to use an alternating current motor of the capacitor type having two similar field windings. A single pole double throw, maintained contact switch 97 is used to reverse the direction of rotation of the motor. This switch consists of a contact blade 98 and a contact blade 99 with a central contact blade 100 adapted to maintain a position to which it is moved on either side of center to complete the contact to either blade 98 or blade 99. This produces the desired direction of rotation of the motor. Switch 97 is operated by a double ended lever 101 connected for rotation with shaft 72 of the tuning unit 13. The lever 101 is provided with switch operating members 102 and 103. These switch operating members, as shown, provide for 180° rotation of the shaft 72 before the direction of rotation is reversed by the switch 97. However, the switch operating members 102 and 103 may be located to provide any desired degree of rotation that may be required to operate the tuning means contained within the tuning unit 13 through its full tuning range.

One side of the alternating current source of motor operating voltage is connected to ground through conductor 104, and the other side is connected through conductor 105 to the motor 96. Switch blade 98 of the reversing switch 97 is connected to one field winding of the motor by means of conductor 106. Conductor 107 connects the other field winding of the motor to switch blade 99 of switch 97. The motor capacitor 108 is connected between conductors 106 and 107.

A double pole double throw and single pole single throw switch 109 is operably connected to the armature 84 of relay 85. When the relay armature 84 is in the closed position, contact blade 110, which is connected to ground, completes the circuit to the fixed contact 111 and through conductor 112 to the center contact blade 100 of reversing switch 97. In this condition the motor field connected to conductor 106 is energized directly from the alternating current source while the other motor field is energized from the alternating current source through the series capacitor 108. The closing of the relay armature moves the clutch member 92 into engagement with clutch member 93 to form a driving connection. The motor then drives shaft 75 through the three stages of reduction gearing. The rotation of shaft 75 is transmitted to the pulley 73 on shaft 72 by means of the cord 74, thus driving the switch operating lever 101 in a counterclockwise direction, as seen in Fig. 1. This motion continues, as long as the relay armature 84 remains in closed position, until switch operating member 102 engages switch blade 98 and moves it, together with blade 100, toward the switch blade 99. The central contact blade 100 is of the over-center snap type which snaps away from contact blade 98 and into engagement with contact blade 99.

This operation of the switch 97 causes a phase change in the field windings of the motor 96 to reverse its direction of rotation. The switch operating lever 101 then rotates in a clockwise direction until the switch operating member 103 engages contact blade 99 and actuates the central contact blade 100 into its original position in engagement with contact blade 98 to again reverse the direction of rotation of the motor.

The portion of the circuit below the FM-AM change-over switch 40 will now be described. Switch 40 is provided with three movable poles 113, 114, and 115. The switch 40 is shown in the FM receiving position with pole 113 completing a circuit to contact 39, pole 114 making electrical contact with switch contact 44, and pole 115 engaging switch contact 43. In this position of the switch, plate voltage is supplied to the FM section of the receiver through conductor 42, switch contact 43, and switch pole 115.

When an FM signal is being received, the audio component of the frequency modulated signal appears at the cathode 36 of the twin diode rectifier tube 32. This audio frequency voltage is applied through resistor 41, switch contact 39, switch pole 113, and capacitor 116 to one end of a variable potentiometer 117, the other end of which is connected to ground. The sliding contact 118 of the potentiometer 117 is connected through a resistor 119 and a coil winding 120 (to be later described), to the grid 121 of an electron tube 122. The tube 122 may be of the triode type having a cathode 123 and a plate 124. Cathode bias is provided for the tube 122 by the resistors 127 and 128 in series connected from cathode 123 to ground, and resistor 125, connected from the high voltage conductor 126 to the cathode 123.

In normal receiving position, the armature 84 of relay 85 is open and the cathode resistor 128 is shorted to ground through the conductor 129 and the fixed contact 130 and movable blade 110 of the relay operated switch 109. At this time only resistor 127 is effective to provide cathode bias for the tube 122. This provides the proper negative grid bias for the tube 122 to function as an audio amplifier. Plate voltage is supplied to the plate 124 of tube 122 through the resistor 131. The amplified audio frequency voltage developed across the resistor 131 may be coupled through a capacitor 132 to an audio frequency power amplifier 133.

The audio frequency power amplifier 133 may be of any well known type commonly used in radio receivers, and is not shown in detail. The amplifier 133 is provided with an output transformer 134 having a center tapped input winding 135, each end of which is connected to the output of the amplifier 133. This transformer has an output winding 136. The transformer shown is of the type required when the power amplifier 133 is equipped with a push-pull output stage. It should be understood, however, that an amplifier with a single ended output stage can also be used, and in that case, the center tap on the winding 135 of the output transformer 134 would not be required.

Plate voltage is supplied to the A. F. power amplifier 133 by means of a conductor 137 connecting the center tap of transformer winding 135 to the power supply filter choke 89. One end of the output winding 136 is connected to ground. The other end of winding 136 is connected, by means of conductor 138, to one end of the relay winding 87 and, by means of conductor 139, to one end of a voice coil 140 of a loud speaker 141. The other end of relay winding 87 is connected to a fixed contact 142 of the relay switch 109. The other end of the voice coil 140 is connected to a fixed contact 143 of the relay switch. A movable contact blade 144, operably connected to relay armature 84, is adapted to make electrical connection to fixed contact 142 in one position and fixed contact 143 in its other position. Blade 144 is connected to ground.

In the normal listening position, the movable contact blade 144 is in contact with the fixed contact 143. This completes the loud speaker circuit from ground through winding 136 of transformer 134, conductor 139, voice coil 140, fixed contact 143, movable contact blade 144, and back to ground. Thus the output of the audio power amplifier is supplied to the loud speaker and the volume level is determined by the position of the sliding contact 118 on the potentiometer 117. Signals may be tuned in manually by operation of the manual tuning knob 78, which drives the tuning unit shaft 72 through the drive cord 74. Operation of the tuning knob 78 also drives the pinion 82 in the gear train through the gear wheel 81, pinion 80, and gear wheel 79. However, the motor shaft pinion 95 and the gear wheel 94 remain stationary since the clutch members 92 and 93 are disengaged except when the tuning unit is being driven by the motor.

For stop-on-signal operation, I provide a stop-on-signal tuning device employed for both AM and FM reception, comprising control tube 145 and oscillator tube 146, both of which may be of the pentode type. Plate voltage is supplied to the plate 147 of oscillator tube 146 through a series resistor 148 and a plate winding 149 of an oscillation transformer 150. This transformer is provided with a feedback winding 151 connected in series with the voltage supply to the screen grid 152 of the tube 146. Thus this oscillation transformer may be adapted to produce oscillations at a high frequency compared to the tuning speed, by feed-back from plate 147 to grid 152. An adjustable resistor 153 is connected from the cathode 154 of tube 146 to ground to adjust cathode bias and the grid voltage at which the tube breaks into oscillation. The grid 155 is connected by means of conductor 162 to cathode 36 of twin diode 32 and cathode 60 of twin diode 59 through a series resistor 163, and is bypassed to ground by a capacitor 164. Resistor 163 and capacitor 164 may be of such value as to provide a predetermined time constant. Thus the output of the FM discriminator double diode 32 applied to the grid 155 controls the start of oscillation of the oscillator 146 during FM operation and the output of the AM discriminator double diode 59 controls the start of oscillation of the oscillator 146 during AM operation. Voltage is supplied to plate 156 of control tube 145 through the resistor 148 and a capacitor 157 is connected from plate 156 to ground to provide a predetermined time constant. Screen voltage is obtained for the screen 158 from a voltage divider circuit consisting of resistors 159, 160, and 153. Cathode 161 is connected to ground. The grid 165 is connected to pole 114 of the change-over switch 40. Thus the grid 165 is connected to the grid of limiter tube 17 during FM reception and to the AVC-detector voltage dividers 68 and 69 during AM reception. In this manner a negative voltage is impressed on the grid 165 in response to the tuning in of either an FM or AM signal. The grid 165 is also connected by means of conductor 166 to the fixed contact 167 of the relay operated switch 109. Contact 167 is engaged by the movable contact blade 168 to complete a circuit to ground when switch 109 is in normal receiving position. This is to prevent oscillation of the tube 146 during normal reception.

A capacitor 169 is connected from grid 165 to ground and may have a value in relation to resistance in the circuit, such as to provide a predetermined time constant for signals applied to grid 165.

At this point, attention may be called to discriminator output resistors 34 and 35, which function as the output resistors of the double diode 32 during FM operation, and as the output resistors for the double diode 59 during AM operation. By employing the same output resistors 34 and 35 for the FM and the AM discriminators, the grid 155 may be connected permanently to receive the output of either discriminator depending on which one is in operation, and no switching of the grid 155 from FM to AM circuits is required.

It will be noticed also that the movable switch pole 113 is connected through contact 39 and resistor 41 to the output of the FM discriminator during FM reception. This movable switch pole 113 is connected through contact 65 and resistor 63 to the juncture between resistors 34 and 35 which are in turn connected to the AM discriminator acting as the AM detector. Thus the demodulated signal during both AM and FM reception is supplied to the volume control resistor 117 through movable switch pole 113 and condenser 116. The alternating current detector output is impressed on the grid 121 of the first audio tube 122 through the volume control slider 118, isolating resistance 119, and oscillator transformer secondary 120. It may be pointed out that during stop-on-signal tuning the negative bias on grid 121, produced by the drop across cathode resistors 127 and 128, is sufficient to prevent any signal transmitted through the slider 118 from operating the stopping relay 85. However, operation of this relay is readily effected by the strong signal induced in the coil 120 when the tube 146 breaks into oscillation.

It will also be seen that the output of the audio amplifier is impressed on the bucking relay winding 87 when the armature 84 of this relay is closed during the time motor 96 is varying tuning unit 13 to tune in a signal. After the signal is tuned in the armature 84 is in the open magnetic circuit position, as shown in Fig. 1, and in this position the voice coil 140 of the speaker is connected to the audio output transformer for audible reception of either FM or AM signals.

The operation during the stop-on-signal tuning and reception of FM and AM signals will now be described. To receive FM signals picked up by antenna 10f, switch 40 is first placed in the right-hand position, as shown in Fig. 1a. This places the three movable poles 113, 114, and 115 of switch 40 in contact with stationary contacts 39, 44, and 43, respectively. This connects the FM discriminator output to the grid 121 of the first audio tube, applies B voltage to the FM receiving apparatus, and connects the grid of the stop-on-signal control tube 145 to the grid of the limiter tube 17. If the start tuning button 90 is now pressed, the direct current voltage drop across choke coil 89 is impressed on winding 86. This attracts armature 84, engages driven clutch dogs 92 with driving clutch dogs 93, and at the same time contacts 110, 144, and 168 are moved to the left into engagement with contacts 111, 142, and out of contact with contact 167 respectively.

The grounding of contact 111 starts motor 96 through connection 112, switch blades 100 and 98, connection 106 and motor lead 105. The motor then drives the rotatable shaft 72 of the tuning unit 13 through large pulley 73, belt 74, small pulley 75, gear 79, pinion 80, gear 81, pinion 82, gear 94, and pinion 95. If no FM signal of sufficient strength is tuned in by the tuning unit before the switch operating member 102 encounters the switch blade 98, the switch blade 100 will be moved over center and will snap out of engagement with contact 98 and into engagement with contact 99, thus reversing motor 96 and thereby the direction of rotation of the shaft 72 and the arm 101. If no signal of sufficient strength should be encountered, the switch operating member 103 will engage contact 99 and snap the switch blade 100 back to the position shown, again reversing the direction of tuner rotation.

However, upon encountering an FM signal of sufficient strength, an increase in the voltage impressed on the grid of limiter 17 takes place as the frequency of the output of converter 12f approaches the frequency at which the I. F. amplifier 16f is resonant. This voltage increase is illustrated by the curve X in Fig. 3. This I. F. signal is rectified by the grid of the tube 17, acting as a rectifier plate, and a direct voltage appears across resistor 19, connected between the grid and the cathode of the tube 17. The negative side of the resistor 19 is connected to the grid 165 of the tuning control tube 145 through the secondary of transformer 18, filter resistor 23, lead 20, contact 44, and movable switch pole 114. As contact 168 has been moved away from contact 167, grid 165 is no longer grounded through lead 166. This negative voltage is thus applied to the grid 165 of the tube 145 substantially reducing or cutting off its plate current flowing from the B voltage source through conductor 126 and through resistor 148. The voltage drop across resistor 148 is thus reduced and the voltage on the plate 147 of oscillator tube 146 is increased, tending to cause tube 146 to break into oscillation. However, resistor 148 is so proportioned with relation to other circuit parameters that oscillation does not take place simply as a result of the increasing negative voltage, as shown by curve X, Fig. 3.

The bias on the grid of tube 146 has been previously adjusted, by means of variable resistor 153, so that oscillation will not occur in tube 146 as long as there is a substantial negative bias on the grid. The curve Y of Fig. 3 represents the output of the FM or AM discriminator plotted against frequency. The midpoint O indicates zero voltage which occurs at the center intermediate frequency, that is, the frequency to which the I. F. and discriminator transformers are tuned. This point O is the point of correct tuning for both FM and AM reception. However, for FM reception, the point O must represent the average voltage over a period of time which is not short relative to the modulation frequency. This is so that the average modulation voltage will be zero and not merely the instantaneous modulation voltage. This, of course, does not apply in the case of AM reception. Voltages below the horizontal line are negative, and those above the line are positive direct current voltages.

It will be seen that when the voltage indicated by curve X has risen, for instance to a point A, a strong negative voltage represented by the point B on curve Y is impressed from the discriminator through delay resistor 163 on the grid 155, thus restraining or preventing oscillation. However, as the tuner brings the converter signal closer to the intermediate frequency, the voltage of curve Y falls from the point B toward the point O and at some point, for instance C, is sufficiently close to zero voltage so that the oscillator tube 146 is no longer prevented from oscillating by excess negative bias on its grid, and as it already has sufficient voltage on its plate 147, it breaks into oscillation. This produces a strong signal in the oscillator plate coil 149, inducing a corresponding voltage in the secondary 120 which is impressed upon the grid 121. This causes a signal to be induced in the output transformer secondary 136, which is connected to the relay bucking coil 87 through movable relay contact 144, stationary contact 142, and conductor 138. The connections to coil 87 may be of such polarity that the first impulse will buck the residual flux in the U-shaped relay core or frame 88, which was set up by the direct current energization of the coil 86. This neutralizes or bucks out the residual flux and permits the spring 91 to move the relay armature 84 back to the position shown in Fig. 1, at the same time moving the relay contact 110, 144, and 168, and the driven clutch dog 92 back into the position shown in that figure. The variation of the tuning unit by the rotation of shaft 72 is thus abruptly terminated with the desired signal correctly tuned in. The motor circuit is opened by relay contact 110. This contact is at the same time moved into engagement with stationary contact 130. This shorts to ground resistor 128, in the cathode circuit of the first audio tube 122, thus reducing the negative grid bias on this tube to the proper value for good quality audio reception. Relay contact 168 is likewise moved into engagement with contact 167. This grounds the grid 165 of control tube 145, thus removing the high negative bias therefrom. The increased plate current of this tube causes a greater voltage drop across resistor 148, reducing the voltage on the plate 147 of the tube 146 to a point which prevents the tube from oscillating, and preventing the oscillator from interfering with audio reception.

The FM signal will remain tuned in until the starting button 90 is again pressed to repeat the operation of tuning in the next FM signal, of sufficient strength.

In the event that during the tuning operation static or other brief interference is encountered, condenser 169 with its associated resistors prevents a rapid build up of negative bias on the grid 165, thus reducing or preventing response to signals of short duration. Also, the condenser 157 associated with resistor 148 tends to delay the change of voltage on the plate 147 and to delay oscillation.

Static and other like disturbances generally consist of broadly distributed high narrow peaks when plotted amplitude versus frequency. In FM operation, these high peaks are largely cut off by the limiter which reduces the signal energy in the form of static more than it reduces the signal energy of a tuned signal. Tests have shown that this receiver can be made substantially unresponsive to heavy static and at the same time responding readily to relatively weak amplitude or frequency modulated broadcast signals.

The operation of the receiver for the stop-on-signal tuning of AM signals will now be described. It may be pointed out, however, that the receiver functions in the same general way for both FM and AM, particularly with respect to the stop-on-signal tuning device, audio amplifier, stopping relay and tuning unit drive, so that the description of these operations will not be repeated in detail.

When it is desired to receive AM signals impressed on the antenna 10*a*, the switch 40 is moved to the left, thus supplying B voltage to the AM receiving apparatus through the contact 49 and cutting off the voltage supply to the FM receiving apparatus through the contact 43. The connection to the grid of the limiter tube 17 is cut off and the grid 165 is connected through movable pole 114, contact 71, conductor 70, and resistor 68, to point 64, where the AM detector and AVC voltage appears. This voltage is reduced somewhat by the voltage divider resistors 68 and 69. The grid 121 of the first audio tube 122 is disconnected from the FM discriminator through the contact 39 and is connected to the output of the AM discriminator or detector through contact 65, movable pole 113, condenser 116, resistor 117, slider 118, resistor 119, and coupling coil 120.

It may be mentioned here that the resistor 63 improves the detector action of the AM discriminator as a detector, improving the audio quality. The detector output impressed on the grid of the first audio tube 122 appears across resistors 63 and 34 in series. That portion which appears across resistor 34 is due to the half wave rectification of the diode 58, 61, while that portion across resistor 63 is due to the full wave rectification of diodes 58, 61, and 57, 60, as resistor 63 is in that portion of the circuit common to both diodes. It will be seen also that the AVC voltage which is supplied to the R. F. amplifier 11*a* and the converter 12*a*, also is taken from the point 64 through resistor 66 and conductor 67.

It will be seen that when the starting button 90 is pressed, and the tuning unit tunes in an AM station, the stop-on-signal action is substantially similar to that described for FM operation with certain exceptions. These include the fact that the negative voltage applied to the grid 165, tending to cause the tube 146 to oscillate, is supplied mainly by the diode 58, 61, of the AM discriminator, and that only a part of the detector voltage determined by the voltage dividers 68 and 69 is employed. The output of the AM discriminator applied to the grid 155 restraining oscillation of this tube until the discriminator voltage approaches zero, is similar to the action during FM operation, except that as there is no frequency variation as a result of modulation no time interval to secure an average voltage is required. However, resistor 163 and capacity 164 may remain in the circuit to avoid additional switching.

The curves shown in Fig. 3 are applicable to AM tuning as well as to FM tuning, except that the curve X shows the AM detector and AVC voltage instead of the limiter grid voltage as in FM operation. The frequency swing, or the width of the intermediate frequency pass band is also generally smaller for AM reception than for broad band FM reception.

At this point attention may be called to the fact that the operation up to this point has been described for the direction of tuning in which the converter frequency approaches the resonance frequency of the discriminator from the negative side of the discriminator curve Y, that is, from the left side of Fig. 3. The action of the discriminator voltage on the grid of the oscillator tube 146 is somewhat different when tuning in the opposite direction, so that the positive peak of the discriminator curve Y is encountered first, that is, when the converter frequency approaches the resonance frequency from the right as shown in Fig. 3. The application of the negative voltage to the grid 165 which tends to cause oscillation and which follows the curve X, in Fig. 3, is the same but on the opposite side of the curve at the point D. However, the voltage applied to the grid 155 indicated by the point E on the curve Y is now a high positive voltage instead of a negative voltage. However, the parameters associated with the tubes 145 and 146 are such that the tube 146 also will not oscillate with a high positive voltage on its grid. This is because the tube 146 draws a high plate current which increases the voltage drop across resistor 148 and reduces the voltage on the plate 147 to a point insufficient to produce oscillation. Therefore, the positive voltage on the grid 155 must fall along the curve Y to some point F in the vicinity of zero voltage before oscillation can occur. It will therefore be seen that oscillation is prevented by a predetermined positive or negative voltage on the grid 155 and oscillation can occur only in the vicinity of zero voltage or, in other words, at the correct tuning frequency. This action is similar for both AM and FM.

Fig. 2 shows an alternate arrangement for FM operation in which the negative voltage applied to the grid 165 of the tube 145 is derived from the FM discriminator instead of from the limiter. Fig. 2 shows a portion of the FM receiving apparatus as shown in Fig. 1*a*, except for modifications to be described. Corresponding parts are indicated by the same numbers.

It will be seen that the connection between contact 44 of the FM—AM conversion switch 40 has been replaced by the conductor 170, filter resistor 171, connection 172, to a negative point with respect to ground on the discriminator output resistor 34. Filter condenser 173 is connected between conductor 170 and ground. It will be seen that the negative voltage tending to cause oscillation may be thus supplied from the discriminator diode 31, 36, if desired. Curve X serves to illustrate the voltage appearing at the point 172 as the correct tuning frequency is approached. The curve X will not be identical in this case to that of Fig. 1*a*, but as the exact tuning is effected in accordance with the curve Y, all that is required for proper operation is that curve X should provide a substantial negative voltage tending to produce oscillation at the center or zero voltage portion of the discriminator curve Y.

In this application I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. In stop-on-signal radio apparatus, a variable tuner means for varying said tuner, means for abruptly terminating variation of said tuner in response to a signal tuned by said tuner, including a discriminator network providing substantially zero voltage output when a signal is tuned in by said tuner, a relay operated quick stopping mechanism responsive to the tuning in of a signal by said tuner, and means coupled to the discriminator output effective to prevent operation of said mechanism until the discriminator voltage output closely approaches zero.

2. In stop-on-signal radio apparatus, a variable tuner, means effecting variation of said tuner, means for terminating said variation in response to the correct tuning of a signal by said tuner including tuner stopping means, means providing a first tuner responsive voltage which has an effectively high value when the signal is correctly tuned, means providing a second tuner responsive voltage which is approximately zero when a signal is correctly tuned in and which has a positive peak before correct tuning from one tuning direction and a negative peak before correct tuning from the other tuning direction, means placing said tuner stopping means in operable condition in response to the increase of said first voltage, and means responsive to said second voltage restraining said operation until said second voltage approaches zero.

3. In stop-on-signal radio apparatus, a variable tuner, means effecting variation of said tuner, an amplifier, means including selective means passing a frequency band of sufficient width to transmit desired modulation coupled to said tuner, means for abruptly terminating tuner variation in response to the tuning in of a signal by said tuner including quick tuner stopping means, a discriminator network producing output voltage of opposite polarity on opposite sides of a center frequency approximately coinciding with the center of said amplified frequency band coupled to said amplifier, means coupling said discriminator to said amplifier to apply an operative voltage to said quick stopping means as a signal is being tuned in by said tuner, and means controlled by said discriminator preventing operation of said quick stopping means except near the center of said amplifier frequency band.

4. In stop-on-signal radio apparatus, a variable tuner, means to vary said tuner, means responsive to a signal tuned in by said tuner for stopping tuner variation at said signal, including tuner stopping means, a discriminator network, the voltage output of which passes through zero at the correct tuning frequency of said signal, and means coupling said discriminator output to said stopping means to effect tuner stoppage in the vicinity of zero discriminator output voltage.

5. In stop-on-signal radio apparatus, a variable tuner, means to vary said tuner, means responsive to a signal tuned in by said tuner for stopping tuner variation at said signal, including tuner stopping means, a discriminator network, the voltage output of which passes through zero at the correct tuning frequency of said signal, and means coupling said discriminator output to said stopping means including means to cause operation of said stopping means as the output voltage of said discriminator approaches zero.

6. In stop-on-signal radio apparatus, in combination, a variable tuner, means for varying said tuner, means for amplifying the output of said tuner, including means passing a frequency band of sufficient width to transmit modulation of desired quality, means for terminating variation of said tuner in response to a signal tuned by said tuner including tuner stopping means, a twin rectifier discriminator stop signal producing means connecting said amplifying means to said stopping means, said stop signal producing means being so constructed and arranged that it supplies no stopping signal in response to amplified frequencies at the outer edges of said frequency band while it supplies a stopping signal and stops said tuner in response to the central frequencies of said band.

7. In frequency modulation radio apparatus, a variable tuner, means for varying said tuner, means for amplifying the output of said tuner, said means passing a frequency band of sufficient width to transmit frequency modulation of desired quality, a limiter coupled to said amplifying means, means for terminating variation of said tuner in response to a frequency modulated signal tuned by said tuner including tuner stopping means, a twin rectifier discriminator coupled to said limiter, each rectifier producing a voltage peak of opposite polarity to that of the other on opposite sides of the center frequency of said frequency band, and means controlled by said discriminator for effecting stoppage of said tuner at a point substantially equidistant with respect to frequency between the two voltage peaks, of said twin rectifiers.

8. In radio apparatus, a variable tuner, means for amplifying the output of said tuner, said means passing a frequency band of sufficient width to transmit modulation of desired quality, a limiter coupled to said amplifying means, means for terminating variation of said tuner in response to a signal tuned by said tuner including tuner stopping means, a twin rectifier discriminator coupled to said limiter, each rectifier producing a voltage peak of opposite polarity to that of the other on opposite sides of the center frequency of said frequency band, and means controlled by said discriminator for effecting stoppage of said tuner at a point substantially equidistant with respect to frequency between the two voltage peaks of said twin rectifiers.

9. In signal controlled apparatus, a device to be operated, a normally blocked electronic oscillator having output elements and a plurality of control elements, means coupling said output elements to said device whereby said device is operated when said oscillator oscillates, means supplying a first voltage changing from a lower to a higher predetermined value connected to one of said control electrodes, means supplying a second voltage changeable from a certain value of one polarity through zero toward a value of opposite polarity, means coupled to said oscillator causing oscillation when said first voltage reaches a certain value and preventing oscillation except when said second voltage approaches zero.

10. In a stop-on-signal radio receiver for reception of amplitude and frequency modulated signals, a variable tuner, means for varying said tuner, means including selective means for amplifying and detecting the frequency modulated output of said tuner, means including selective means for amplifying and detecting the amplitude modulated output of said tuner, a low frequency amplifier and a reproducer, relay means for stopping the variation of said tuner in response to a signal tuned by the tuner, switch means controlled by said relay means effective to connect said relay means to said low frequency amplifier during variation of said tuner and to connect said reproducer to said low frequency amplifier when tuner variation is stopped, and manually operable switch means for connecting said low frequency amplifier to said frequency modulated amplifying and detecting means or to said amplitude modulated amplifying and detecting means to effect the stop-on-signal tuning in of frequency modulated or amplitude modulated signals respectively.

11. In a stop-on-signal radio receiver for reception of amplitude and frequency modulated signals, a variable tuner, means for varying said tuner, means including selective means for amplifying and detecting the frequency modulated output of said tuner, means including selective means for amplifying and detecting the amplitude modulated output of said tuner, relay means for stopping the variation of said tuner in response to a frequency or amplitude modulated signal tuned by the tuner, means supplying a relay operating signal in response to the tuning of a frequency or amplitude modulated signal tuned by said tuner, means coupling said tuning signal means to said relay means, and manually operable switch means for connecting said tuning signal means to said frequency modulated amplifying and detecting means or to said amplitude modulated amplifying and detecting means to effect stop-on-signal tuning of frequency modulated or amplitude modulated signals respectively.

12. In a stop-on-signal radio receiver for reception of amplitude and frequency modulated signals, a variable tuner, means for varying said tuner, means including selective means for amplifying and detecting the frequency modulated output of said tuner, means including selective means for amplifying and detecting the amplitude modulated output of said tuner, means for stopping the variation of said tuner in response to a frequency or amplitude modulated signal tuned by said tuner, and manually operable switch means for connecting said tuner variation stopping means to said frequency modulated amplifying and detecting means or to said amplitude modulated amplifying and detecting means to effect stop-on-signal tuning of frequency modulated or amplitude modulated signals respectively.

13. In stop-on-signal radio apparatus, a variable tuner, means to vary said tuner, means for stopping said tuner, means including rectifying means supplied with a signal tuned in by said tuner and supplying a direct current voltage to operate said stopping means, twin rectifiers supplied with a signal tuned by said tuner and having output resistors connected in series with opposite polarity so that the voltage output of one is equal and opposite to the voltage output of the other at the correct tuning frequency of said signal, and means coupling said twin rectifiers to said stopping means to insure tuner stoppage at a position where the output of said twin rectifiers approach zero voltage.

14. In stop-on-signal radio apparatus, a variable tuner, means to vary said tuner, means for stopping said tuner, means responsive to a signal tuned in by said tuner to operate said stopping means, twin rectifiers supplied with a signal tuned by said tuner and connected so that the voltage output of one is equal and opposite to the other at the correct tuning frequency of said signal, and means coupling said twin rectifiers to said stopping means to prevent tuner stoppage until the output of said twin rectifiers approaches zero voltage.

15. In stop-on-signal radio apparatus, a variable tuner, means for varying said tuner, a discriminator network providing substantially zero voltage output when a signal is correctly tuned in by said tuner, a stopping mechanism responsive to the tuning in of a signal by said tuner, and means responsive to the discriminator output effective to prevent operation of said stopping mechanism until the discriminator voltage output closely approaches zero.

16. In stop-on-signal radio apparatus, in combination, a variable tuner, means for varying said tuner, means for amplifying the output of said tuner including means passing a frequency band of sufficient width to transmit modulation of desired quality, means for terminating variation of said tuner in response to a signal tuned by said tuner including, tuner stopping means, a twin rectifier discriminator stop signal network coupled to said amplifying means and to said stopping means, said stop signal network being constructed and arranged to effect stoppage of said tuner only on the central frequencies of said amplified frequency band.

17. In stop-on-signal frequency modulation apparatus, a variable tuner, means for varying said tuner, means for amplifying the output of said tuner, said amplifying means passing a frequency band only of sufficient width to transmit frequency modulation of desired quality, a limiter coupled to said amplifying means, means for terminating variation of said tuner in response to a frequency modulated signal tuned by said tuner including tuner stopping means, stop signal supply means coupled between said limiter and said stopping means, said signal supply means including means for preventing the stop signal from being supplied except in a frequency band much narrower than and adjacent the center of said amplifying means frequency band.

18. In stop-on-signal radio apparatus, a variable tuner, means for varying said tuner, means for amplifying the output of said tuner, said amplifying means passing a frequency band of sufficient width to transmit modulation of desired quality, a limiter coupled to said amplifying means, means for terminating variation of said tuner in response to a signal tuned by said tuner including tuner stopping means, stop signal supply means coupled between said limiter and said stopping means, said signal supply means including means for preventing the stop signal from being supplied except in a frequency band much narrower than and adjacent the center of said amplifying means frequency band.

19. In a stop-on-signal radio receiver for receiving tuned signals in the presence of brief intense interference, a variable tuner, means for varying said tuner, means for amplifying the output of said tuner, said amplifying means passing a frequency band of sufficient width to transmit modulation of desired quality, means for terminating variation of said tuner in response to a signal tuned by said tuner including tuner stopping means, stop signal supply means coupled between said amplifying means and said stopping means, said stop signal supply means including means for preventing the stop signal from being supplied except in a frequency band much narrower than and adjacent the center of said amplifying means frequency band, and means including a limiter coupled between said amplifying means and said stopping means and circuit time constant means delaying the operation of said stopping means for preventing response to brief interference.

20. In a stop-on-signal radio receiver for receiving tuned signals in the presence of brief intense interference, a variable tuner, means for varying said tuner, means for amplifying the output of said tuner, said amplifying means passing a frequency band of sufficient width to transmit modulation of desired quality, means for terminating variation of said tuner in response to a signal tuned by said tuner including tuner stopping means, stop signal supply means coupled between said amplifying means and said stopping means, said stop signal supply means including means for preventing the stop signal from being supplied except in a frequency band much narrower than and adjacent the center of said amplifying means frequency band, and means including circuit time constant means for preventing response to brief interference.

21. In stop-on-signal radio apparatus, a variable tuner, means for varying said tuner, means for terminating variation of said tuner in response to a signal tuned by said tuner including tuner stopping means, a twin rectifier discriminator coupled to said tuner, stop signal producing means coupling said discriminator to said stopping means, said stop signal producing means being so constructed and arranged as to prevent stoppage in response to the peak voltage output of either discriminator rectifier while it permits stoppage of said tuner as the voltage output of one discriminator rectifier becomes equal and opposite to that of the other.

22. In a signal controlled apparatus, a device to be operated, an electronic oscillator, means coupling said oscillator to said device whereby said device is operated when said oscillator oscillates, a discriminator supplying a first control voltage to said oscillator, means supplying a second control voltage to said oscillator tending to cause oscillation when said second control voltage reaches a predetermined value, said oscillator being so constructed and connected that oscillation will commence only when said second control voltage reaches said predetermined value and when said first control voltage from said discriminator approaches zero.

23. In a stop-on-signal radio apparatus, a variable tuner, means for varying said tuner, means for terminating variation of said tuner in response to a signal tuned by said tuner including tuner stopping means, a twin rectifier discriminator coupled to said tuner, stop signal producing means comprising an electronic oscillator, means coupling said oscillator to said tuner stopping means whereby said tuner stopping means is operated when said oscillator oscillates, a first control voltage supplied by said discriminator to said oscillator, means coupled to said tuner for supplying a second control voltage to said oscillator tending to cause oscillation as a signal is tuned in and when said second control voltage reaches a predetermined value, said oscillator being so constructed and connected that oscillation will commence only when said second control voltage reaches said predetermined value and when said first control voltage from said discriminator approaches zero.

WILLIAM J. O'BRIEN.

References Cited in the file of this patent

UNITED STATES PATENTS

| Number | Name | Date |
|---|---|---|
| 2,262,218 | Andrews | Nov. 11, 1941 |
| 2,369,542 | Dietrich | Feb. 13, 1945 |
| 2,441,028 | Mathews | May 4, 1948 |
| 2,478,977 | Nicholson | Aug. 16, 1949 |
| 2,506,869 | Gull | May 9, 1950 |
| 2,529,677 | Case | Nov. 14, 1950 |